United States Patent [19]

Seegmiller

[11] Patent Number: 5,523,959
[45] Date of Patent: Jun. 4, 1996

[54] ICE DETECTOR AND DEICING FLUID EFFECTIVENESS MONITORING SYSTEM

[75] Inventor: H. Lee B. Seegmiller, Los Gatos, Calif.

[73] Assignee: The United States of America as represented by the Administrator of the National Aeronautics and Space Administration, Washington, D.C.

[21] Appl. No.: 233,676

[22] Filed: Apr. 25, 1994

[51] Int. Cl.⁶ .......................... G08B 19/02; B64D 15/20
[52] U.S. Cl. ..................... 364/550; 364/557; 73/170.26; 324/654; 324/657; 340/580; 340/581; 340/962; 244/134 R; 244/134 F
[58] Field of Search ................... 364/550, 557, 364/424.06, 439, 551.01; 340/580, 581, 582, 601, 602, 962; 324/654, 655, 656, 657; 73/170.26, 335.03; 244/134 R, 134 F

[56] References Cited

U.S. PATENT DOCUMENTS

| | | | |
|---|---|---|---|
| 3,277,459 | 10/1966 | Werner | 340/234 |
| 3,282,097 | 11/1966 | Schmid et al. | 73/170.26 |
| 3,517,900 | 6/1970 | Roussel | 244/134 R |
| 3,594,775 | 7/1971 | Fox | 364/557 |
| 3,596,264 | 7/1971 | Ciemochowski et al. | 340/581 |
| 3,634,841 | 1/1972 | Irvine | 340/581 |
| 4,051,466 | 9/1977 | Protze | 340/601 |
| 4,222,044 | 9/1980 | Boschung | 340/580 |
| 4,281,286 | 7/1981 | Briggs | 340/602 |
| 4,418,570 | 12/1983 | Warren, Jr. et al. | 73/170.26 |
| 4,522,060 | 6/1985 | Murata et al. | 73/335.03 |
| 4,745,803 | 5/1988 | Haavasoja | 73/170 R |
| 4,766,369 | 8/1988 | Weinstein | 324/61 R |
| 4,775,118 | 10/1988 | Daniels | 340/580 |
| 4,819,480 | 4/1989 | Sabin | 73/170 R |
| 4,875,644 | 10/1989 | Adams et al. | 244/134 R |
| 4,897,597 | 1/1990 | Whitener | 324/693 |
| 4,996,493 | 2/1991 | Monat et al. | 324/664 |
| 5,005,015 | 4/1991 | Dehn et al. | 340/580 |
| 5,134,380 | 7/1992 | Jonas | 324/674 |
| 5,206,806 | 4/1993 | Geradi | 364/424.06 |
| 5,354,015 | 10/1994 | Meador | 340/580 |

OTHER PUBLICATIONS

Technical Brochure of Innovative Dynamics, Inc. entitled "Thin Film Capacitive Ice Sensor." No Date.

Primary Examiner—Emanuel T. Voeltz
Assistant Examiner—Eric W. Stamber
Attorney, Agent, or Firm—Kenneth L. Warsh; Guy Miller

[57] ABSTRACT

An ice detector and deicing fluid effectiveness monitoring system for an aircraft is disclosed. The ice detection portion is particularly suited for use in flight to notify the flight crew of an accumulation of ice on an aircraft lifting and control surfaces, or helicopter rotors, whereas the deicing fluid effectiveness monitoring portion is particularly suited for use on the ground to notify the flight crew of the possible loss of the effectiveness of the deicing fluid. The ice detection portion comprises a temperature sensor and a parallel arrangement of electrodes whose coefficient of coupling is indicative of the formation of the ice, as well as the thickness of the formed ice. The fluid effectiveness monitoring portion comprises a temperature sensor and an ionic-conduction cell array that measures the conductivity of the deicing fluid which is indicative of its concentration and, thus, its freezing point. By measuring the temperature and having knowledge of the freezing point of the deicing fluid, the fluid effectiveness monitoring portion predicts when the deicing fluid may lose its effectiveness because its freezing point may correspond to the temperature of the ambient.

34 Claims, 8 Drawing Sheets

ICE DETECTOR AND DEICING FLUID EFFECTIVENESS MONITORING SYSTEM

ORIGIN OF THE DISCLOSURE

The invention described herein was made by an employee of the National Aeronautics and Space Administration and it may be manufactured and used by and for the United States Government for governmental purposes without the payment of royalties thereon or therefor.

BACKGROUND OF THE INVENTION

A. Technical Field of the Invention

The present invention relates to a warning system, and more particularly, to an ice detector and a deicing fluid effectiveness monitoring system that warns the flight crew of an aircraft that ice is formed on a first lifting or control surface of the aircraft and that the strength or concentration of the deicer, being applied to a second lifting or control surface of the aircraft while it is on the ground, is in danger of losing its effectiveness so that ice might form thereon.

B. Description of the Prior Art

Since the accumulation of ice on any lifting or control surface, such as a wing, of an aircraft or helicopter rotor can produce disasterous results, it is important for the aircraft to have ice detection means to notify the flight crew when ice starts to appear on such a surface and also the thickness of such accumulating ice. This knowledge allows the flight crew to take measures to remove the ice, such as turning on deicing systems, surface heaters, or changing the flight course speed or elevation. Such ice detection is typically accomplished by the use of capacitance sensors such as those described in U.S. Pat. No. 4,766,369, issued Aug. 23, 1988 and herein incorporated by reference. Although these capacitance sensors serve well their intended purpose, these sensors have limited area capabilities so that these sensors may indicate a safe condition for a first portion of a surface of interest, whereas another portion adjacent to the first portion may be experiencing the presence of ice, or scattered frozen rain drops. It is desired that ice detection means be provided that is not limited in its area or region of monitoring, but rather monitor and accurately measure a relatively large region for the accumulation of ice, as well as determine the thickness of such accumulated ice.

In addition to ice detection, the flight crew, as well as the ground crew, of an aircraft should be provided with the knowledge of the effectiveness of the deicing process that is typically performed, during ground operations, to eliminate ice created by snow or freezing rain. Frequently, ethylene glycol, commonly known as antifreeze, is employed as a deicing fluid. This deicing fluid, as well as many other deicing fluids, is an environmentally hazardous fluid and its use should be restricted, if possible, for environmental considerations.

The effectiveness of the use of the deicing fluid is dependent upon its strength or concentration, wherein a strong concentration of heated deicing fluid is very effective in melting any accumulated ice and a weak or diluted concentration of the deicing fluid may not even melt any ice and may permit rapid reformation of ice. Whereas, enough deicing fluid should definitely be used to insure the safety of the aircraft, excessive amounts of deicing fluids only degrade the environment and, therefore, the aircraft should be provided with means, such as a deicing fluid effectiveness monitoring subsystem, that allows the flight or ground crews to monitor the effectiveness of the deicing fluid so that only as much deicing fluid as needed is applied to accomplish its desired results without unduly violating the integrity of the environment. It is desired that a deicing fluid effectiveness monitoring subsystem be provided so that usage of deicing fluid may be critically monitored to safeguard against any unnecessary environmental degradation and also insure safe operation of the aircraft by reapplication when necessary.

The ice detection and deicing fluid effectiveness monitoring subsystems need to provide accurate measurements in order to accomplish their desired results and, accordingly, should be periodically calibrated against standards so as to ascertain whether or not any correction factors or adjustments are needed to maintain the accuracy of these subsystems.

The determination provided by these ice detection and fluid effectiveness monitoring subsystems are critical to the safety of the aircraft and the flight crews, as well as the ground crew, and, therefore, the aircraft should be provided with appropriate displays comprising audible and visible alarms, so as to allow the aircraft personnel to properly react to any alarm conditions.

The ice detection and fluid effectiveness monitoring subsystems should each be provided so as to properly perform its necessary tasks, but the individual effectiveness of each separated subsystem could be substantially improved if both subsystems were integrated into one system.

It is, therefore, a principal object of the present invention to provide an ice detection and a deicing fluid effectiveness monitoring system for an aircraft that monitors for and alerts the personnel of the aircraft of the dangers related to the formation of ice and/or to the dangers that might possibly occur due to the use of ineffective or degraded deicing fluid.

It is another object of the present invention to provide an ice detection subsystem that accurately monitors a relatively wide surface of interest of an aircraft, such as a major portion of a wing or rotor blade of the aircraft.

Still further, it is an object of the present invention to provide a system having built-in devices that serve as standards that are used to calibrate the ice detection and deicing fluid effectiveness monitoring subsystems so that the accuracy of these subsystems may be maintained.

Further still, it is an object of the present invention to provide an ice detection and deicing fluid effectiveness monitoring system provided with appropriate visual and audible displays to alert the personnel of the aircraft of any related alarm conditions requiring their attention and/or their response.

SUMMARY OF THE INVENTION

The present invention is directed to an ice detection and deicing fluid effectiveness monitoring system for respectively and accurately measuring ice accumulation over a relatively large surface of interest and for measuring the effectiveness of the deicing fluid being used in the deicing operation so that the overall safety of an aircraft, during flight and on the ground, is more surely safeguarded.

The ice detecting and deicing fluid effectiveness monitoring system comprises inductive ice-sensing electrodes, first and second means for measuring respective temperatures, an ionic-conduction cell array, a frequency generator, a voltage detector means, means for selecting individual cells of the ionic-conduction array, bridge means, and processing means. The inductive ice-sensing electrodes are flush mounted onto a first surface of interest and comprise a transmitting electrode and at least one receiving electrode. These electrodes are insulated to avoid a spurious reading caused by conductive substances or electrolytes. The coefficient of coupling between the transmitting and receiving electrodes is determined by at least two factors, with the first being the predetermined geometry and spacing between the electrodes and the second being the inductive coupling susceptibility of the substance in the general region of the spaced apart electrodes. This susceptibility is indicative of the presence and thickness of ice on the first surface at temperatures below freezing. The first means for measuring temperature is flush mounted onto the first surface of interest and provides a signal indicative of the first measured temperature. The frequency generator supplies an excitation signal and has means for being connected to the transmitting electrode of the inductive ice-sensing array. The voltage detector means has means for being connected to the receiving electrode of the inductive ice-sensing array and detects a proportion of the supplied excitation signal to the transmitting electrode as a function of the coefficient of coupling between the transmitting and the receiving electrode. The voltage detector means generates an output signal representative of thickness of adhering ice, frost or water substance in the general region between the spaced apart electrodes. The ionic-conduction cell array is flush mounted onto a second surface of interest and has a common electrode and a plurality of selectable electrodes, one for each cell of the array. The second means for measuring temperature is flush mounted onto the second surface of interest and provides a signal indicative of the second measured temperature. The means for selecting individual cells of the ionic conduction array applies a first polarity of the excitation signal to the common electrode and a second or opposite polarity of the excitation signal to the selected cell of the array. The application of these opposite polarities of the excitation signal causes the selected electrode to supply a deicing fluid substance conductivity signal indicative of the conductivity of the deicing fluid substance that spans between the selected electrode and the common electrode. The bridge means, preferably of a resistance type, is connected to receive the deicing fluid substance conductivity signal and generates an output signal representative of the ionic conductivity of the deicing fluid substance in contact with the selected cell of the ionic-conduction array. The processing means has means for receiving the first measured temperature signal, the second measured temperature signal, the adhering ice, frost or water substance signal, and the ionic conductivity substance signal. The processing means examines (1) the first measured temperature signal and the adhering ice, frost or water substance signal and determines if ice or frost is formed on the first surface of interest, and (2) the second measured temperature signal and the ionic conductivity substance signal to determine the freezing point of the deicing fluid residue on the second surface of interest.

The processing means further comprises means for determining the thickness of the ice or frost formed on the first surface of interest, as well as means for determining when and if ice is to be formed on the second surface of interest. The processing means reads, stores, and manipulates its received signals to generate output signals to external devices that alert the personnel of the aircraft of any detected alarm conditions.

DETAILED DESCRIPTION OF THE PREFERRED EMBODIMENTS

Figure 1:
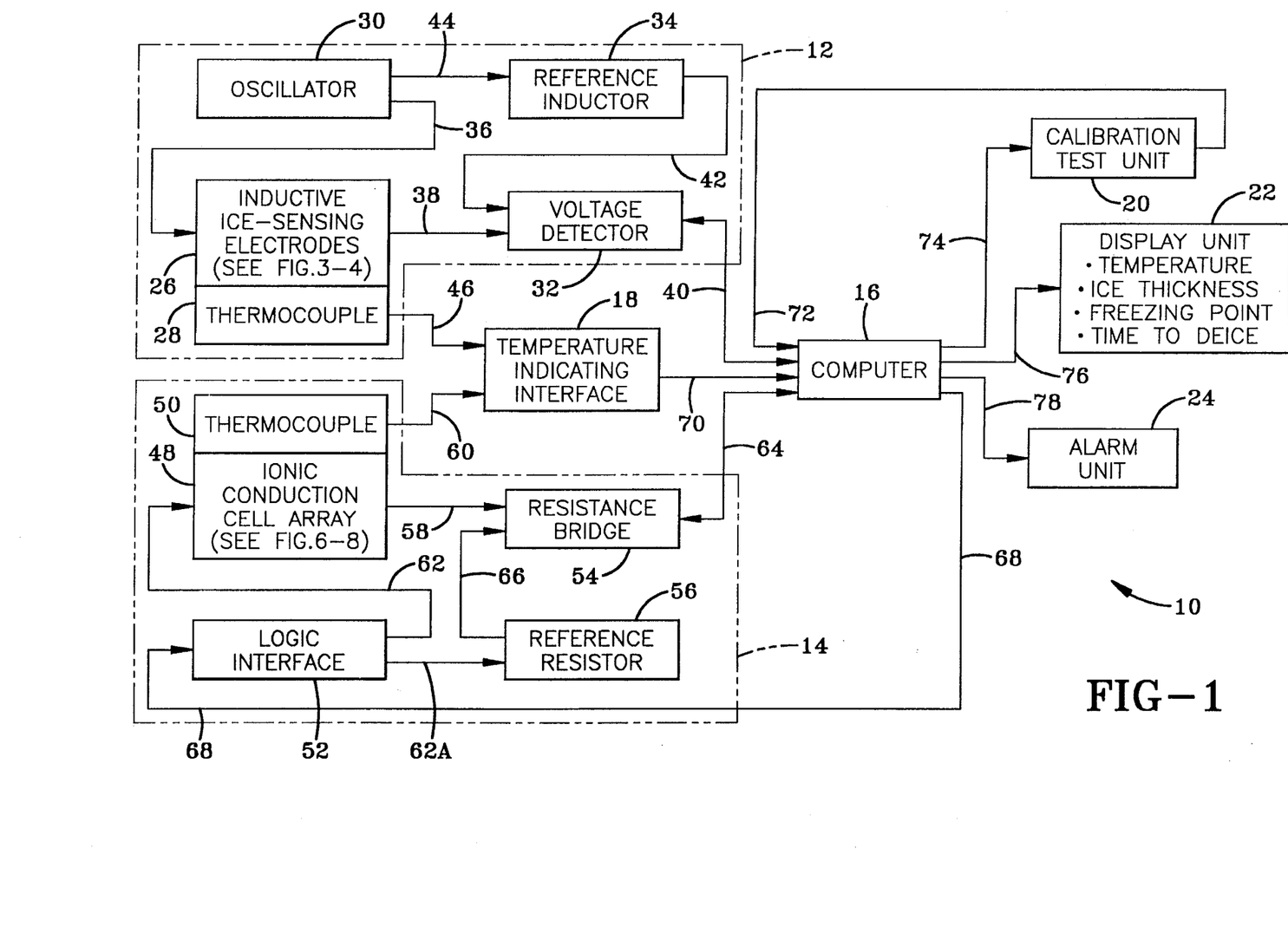
FIG. 1 is a block diagram of the ice detection and deicing fluid effectiveness monitoring system of the present invention.

Referring to the drawings, wherein like reference numbers are used to indicate like elements, there is shown in FIG. 1 a block diagram of an ice detector and deicing fluid effectiveness monitoring system 10 of the present invention. The present invention provides a timely warning to an aircraft flight crew of the accumulation of ice on aircraft lifting and control surfaces so that the crew can take corrective action avoiding a hazardous condition by activating ice removal equipment, such as heaters, or by changing course or altitude. The invention also provides a warning system of the loss of effectiveness of deicing fluid applied while the aircraft is located on the ground during snowfall or freezing rain conditions; thereby, avoiding the dangers of an accident during takeoff. The present invention integrates three different types of sensors (temperature, ice, and effectiveness of a deicer fluid) into an ice detection and deicer fluid effectiveness warning system. The system also includes provisions for continuous and automatic self-calibration of the system so that the accuracy of the measurements of the system is assured. The system 10 comprises an ice detection subsystem 12, a deicer fluid effectiveness monitoring subsystem 14, a processing means comprising a computer 16, preferably a temperature indicating interface device 18, a calibration test unit 20, and a display unit 22 that indicates temperatures, ice thicknesses, freezing point of deicing fluid, and time to reapply deicing fluid. The system 10 further comprises an alarm unit 24.

The ice detection subsystem 12 detects and measures a relatively large surface of interest for the accumulation of ice and its thickness. The ice detection subsystem 12 comprises a plurality of elements each having a reference number and all of which is given in Table 1.

TABLE 1

| REFERENCE NO. | ELEMENT |
| --- | --- |
| 26 | INDUCTIVE ICE-SENSING ELECTRODES |
| 28 | THERMOCOUPLE |
| 30 | OSCILLATOR |
| 32 | VOLTAGE DETECTOR |
| 34 | REFERENCE INDUCTOR |

The inductive ice-sensing array 26 is flush mounted onto a first surface of interest and comprises a transmitting electrode and at least one receiving electrode. As to be further described with reference to FIG. 3, the inductive ice-sensing array has a coefficient of coupling, between the transmitting and receiving electrodes, that is determined by two factors, with the first being the predetermined geometry and spacing between the electrodes, and the second being the inductive coupling susceptibility and thickness of the substance, such as ice, water or frost, in the general region of the spaced apart electrodes. In flight the inductive coupling is primarily indicative of the thickness of ice on the first surface between the insulated, spaced apart electrodes.

The oscillator 30, via signal path 36, supplies an excitation signal and has means for being connected to the transmitting electrode. The oscillator 30, or some other type frequency generator, generates a signal having a frequency in the range from about 5 khz to about 40 Mhz, which frequency is preferably selected so as not to interfere with the other electronic equipment of the aircraft. The output of the receiving electrode of the inductive ice-sensing array is routed, via signal path 38, to the voltage detector means 32.

The voltage detector means 32 detects the excitation signal applied to the transmitting electrode that is inductively coupled to the receiving electrode. The amount or proportion of the coupled signal is also dependent upon the coefficient of coupling which, as previously mentioned, is determined for a given detector configuration by the thickness of water or ice in the general region between the coupled and spaced-apart electrodes.

As is known, in order to form ice, two conditions must be present, the first being that the surface temperature must be at the freezing point or below, and the second being that there must be sufficient moisture or water in the air to form ice. The inductive ice-sensing electrodes of array 26, by means of its coefficient of coupling, provides an output signal to the voltage detector 32 which is representative of the substance on the surface in the general region of the spaced-apart electrodes and thus, serves to indicate the presence of water or ice. The voltage detector 32 monitors for any changes on signal path 38 due to changes in inductive coupling. More particularly, the voltage detector 32 operates so that any changes (relative to an initial condition corresponding to e.g., the lack of moisture in the general region of the transmitting and receiving electrodes) created by the presence of ice, water or moisture in the general region of the electrodes results in a corresponding change in the voltage measured by the voltage detector 32. This detected change is supplied to computer 16 by way of signal path 40.

The voltage detector 32 further comprises a test input (not shown) to which is applied, via signal path 42, the output of reference inductor 34 that receives, via signal path 44, the excitation signal from the oscillator 30 which is also applied to the transmitting electrode of the ice-sensing array 26. The reference inductor 34 supplies a reference signal to the voltage detector 32 which is used, for calibration purposes (to be more fully described with reference to FIG. 9), as a standard against which the operating signal, on signal path 38, from the inductive ice-sensing array 26 is compared. The ice detector subsystem 12 has a further signal path 46 that routes the output of the thermocouple 28 to the temperature indicating interface 18.

The deicer fluid effectiveness monitoring subsystem 14 monitors the effectiveness of the deicing fluid normally applied while the aircraft is awaiting its eventual takeoff. The deicing fluid may comprise a variety of types, such as ethylene glycol, commonly known as anti-freeze, which is an environmentally hazardous fluid. Accordingly, as discussed in the "Background" section, ethylene glycol should certainly be used in sufficient amounts to assure for the safety of aircraft during takeoff, but its usage should also be limited to an amount that does not cause for any unnecessary clean up of this environmentally hazardous substance. The deicing fluids are commonly used to melt and remove accumulated ice and snow so as to restore normal aerodynamic functions to lifting and control surfaces of the aircraft. Normally, the deicing fluid is applied in a spray-like manner so that a major portion thereof falls off of the lifting or control surface but leaves a residue film that continues its deicing function. In the presence of freezing rain or snow, the concentration or strength of the deicing fluid may be diluted, thereby, raising its freezing point toward ambient temperature. As the residue film of deicing fluid present on the aircraft is diluted, the deicer fluid loses its effectiveness, and thereby possibly allows ice to accumulate. The subsystem 14 of the present invention provides a means for warning the flight crew that the accumulation of ice has occurred or may reoccur within the immediate future so that takeoff should not be attempted until deicing fluid is reapplied. The subsystem 14 comprises a plurality of elements having reference numbers all of which are given in Table 2.

TABLE 2

| REFERENCE NO. | ELEMENT |
| --- | --- |
| 48 | IONIC CONDUCTION CELL ARRAY |
| 50 | THERMOCOUPLE |
| 52 | LOGIC INTERFACE |
| 54 | RESISTANCE BRIDGE |
| 56 | REFERENCE RESISTOR |

The ionic-conduction cell array 48 is flush mounted onto a second surface of interest, has a common electrode and one selectable electrode for each cell of the array, and provides an output signal on signal path 58 that is routed to resistance bridge 54. The thermocouple 50 is flush mounted onto the second surface of interest and provides a signal, that is indicative of its measured temperature, via signal path 60, to the temperature indicating interface 18. The thermocouple 50, as well as the thermocouple 28, may alternatively be a thermister or some other resistance temperature sensing device. The present invention provides means for individually selecting, by way of signal path 62, each cell of the array 48 and also means for selecting reference resistor 56 by way of signal path 62A. This means interfaced with both devices 48 and 56 is illustrated as logic interface 52.

The logic interface 52 applies a first polarity of excitation to the common electrode (to be described hereinafter with reference to FIGS. 6–8) of the cell array 48, and also selectably applies a second (preferably opposite to the first) polarity of excitation to each cell of the array. The application of the first and second polarities of excitation causes the selected cell to generate a signal indicative of the conductivity of the substance (deicing fluid) that spans between the selected cell and the common electrode. The measured conductivity is also a function of the thickness of the liquid layer on the cell surface. However, after the initial flood of deicing fluid during application, the liquid achieves an equilibrium thickness which is small relative to the spacing between the common electrode and the center electrodes (both electrodes to be described with reference to FIG. 8). For some deicing fluids it may be advantageous to intermix cells of greater or less spacing to provide a means of verifying that an equilibrium liquid thickness has occurred.

As is known in the art, the conductivity of a substance is a measurement of the ionic conductivity characteristic of that substance which, in turn, may be used to determine the strength or concentration of the measured substance, i.e., the deicing fluid. The substance conductivity signal, generated by the selected cell, is applied to the bridge 54, which is preferably of a resistance type, having four initially balanced legs. More particularly, the substance conductivity signal is applied to one of the legs and causes an unbalance between the four legs. The unbalance is indicative of the level of the substance conductivity signal. The resistance bridge 54 receives the substance conductivity signal and generates an output signal representative of ionic conductivity of the substance in contact with the selected cell and which output signal is routed to the computer 16, via the signal path 64. As will be further described with reference to FIG. 9, the resistance bridge means 54, has a test input to which is applied, via signal path 66, the reference resistor 56 serving as a reference standard used to calibrate the resistance bridge means 54 in a similar manner as described for the reference inductor 34 calibration function for the voltage detector 32. The deicer fluid effectiveness monitoring subsystem 14 has a further signal path 68 which interconnects the control signals of computer 16 to the logic interface 52.

The computer 16 is preferably adapted to serve as a ruggedized airborne computer serving the needs of the ice detector and deicer fluid effectiveness monitoring system 10, as well as control and display needs of the aircraft. The computer 16 has means for receiving the first and second measured temperature signals of thermocouples 28 and 50, respectively, preferably applied to the computer 16 by the temperature indicating interface 18 via the signal path 70 which may comprise two paths with the first path assigned to the signal related to thermocouple 28 and the second path assigned to the signal related to thermocouple 50. If desired, the signals measured by thermocouples 28 and 50 may be directly applied to the computer 16 each having its own signal path. Further, the computer 16 has means for receiving the ice substance thickness signal from the voltage detector 32 via signal path 40 (shown as a bilateral path) and also has means to receive the ionic conductivity signal of resistance bridge 54, via signal path 64 (also shown as a bilateral path).

In general, the computer 16, programmed in a manner known in the art, examines both (1) the first measured temperature signal on signal path 70 and the ice substance thickness signal on signal path 40 to determine if ice is formed on the first surface of interest, and (2) the second measured temperature signal on signal path 70 and the ionic conductivity signal on signal path 64 to determine if ice is capable of being formed on the second surface of interest because the concentration (and thus its ionic conductivity characteristic) of the deicing fluid is diluted so that its freezing point approaches and may reach that of the ambient temperature. Further, the computer 16 in response to the first and second measured temperature signals, the ice substance thickness signal, and the ionic conductivity signal, is programmed in a manner known in the art, to generate output signals to display unit 22 that indicate the respective temperatures of the first and second surfaces of interest, as well as the ice thickness on the first surface. The computer 16 also generates output signals to display unit 22 that indicate the calculated freezing temperature of the deicing fluid residue on the second surface of interest and the estimated time remaining before freezing will occur. Finally, the computer 16 is programmed in a manner known in the art, to generate output signals to alarm unit 24, via signal path 78, if its program detects any alarm conditions. The signal paths shown in FIG. 1, as well as the first and second surfaces of interest, may be further described with reference to FIG. 2.

Figure 2:
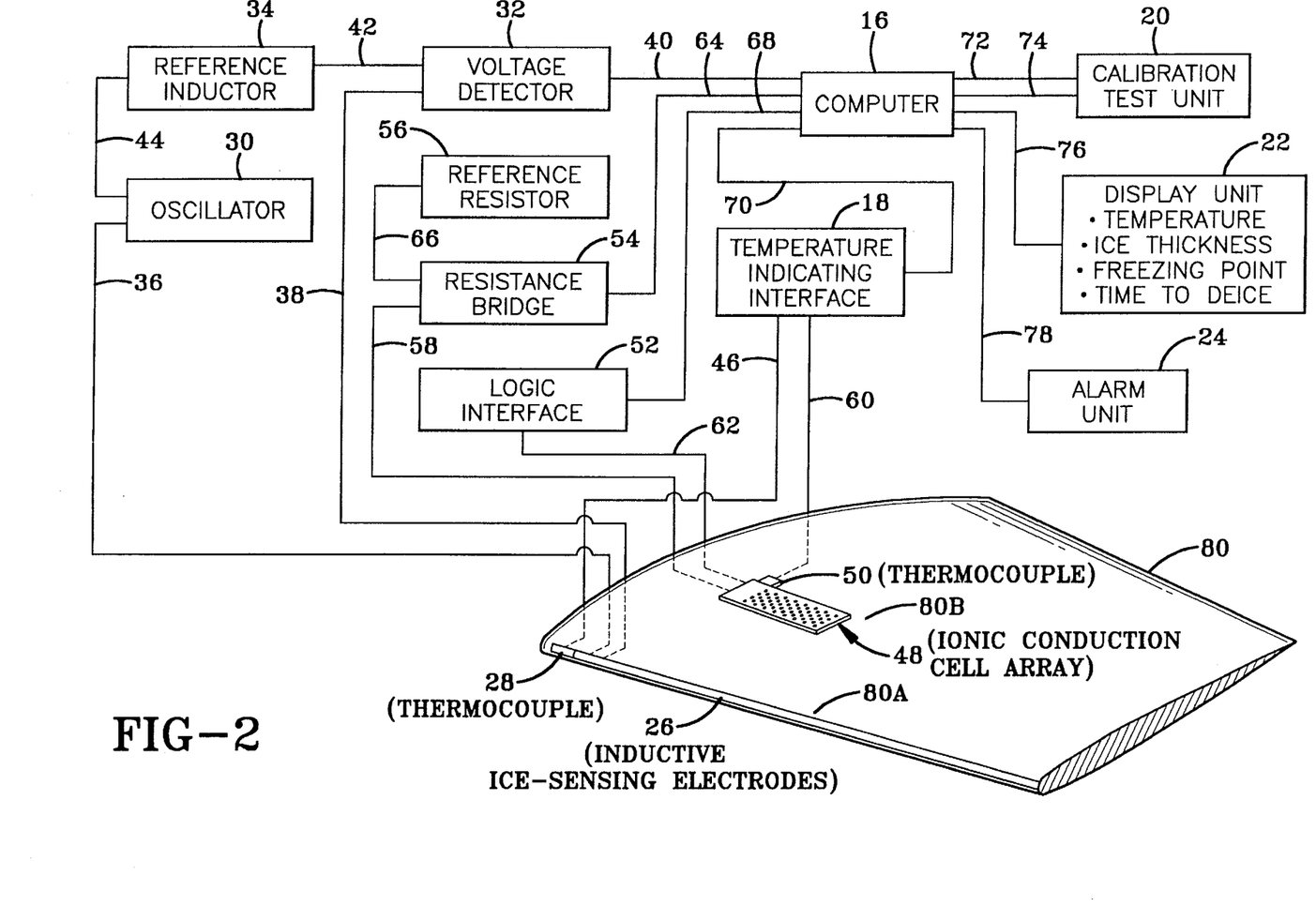
FIG. 2 generally illustrates the signal paths between the various elements comprising the system of FIG. 1.

FIG. 2 shows the inductive ice-sensing electrodes of array 26 and the thermocouple 28 both located on the first surface of interest 80A, which is on an outer edge of the surface 80. Similarly, FIG. 2 shows the ionic-conduction cell array 48 and the thermocouple 50 flush mounted onto the second surface of interest 80B, which is also part of the surface 80. The surface 80 may comprise any surface, such as a wing of an aircraft helicopter rotor or even an engine intake surface, where the formation of ice may be detrimental to the operation of the aircraft. Further, the present invention contemplates that surface 80 need not be part of an aircraft, but rather may be any surface on any vehicle or stationary device, such as a sidewalk, where the formation of ice or the ineffectiveness of deicing fluid may be detrimental. FIG. 2 further shows, in part, the signal paths or cable runs arrangements, of the inductive ice-sensing electrodes or array 26 which may be further described with reference to FIG. 3.

Figure 3:
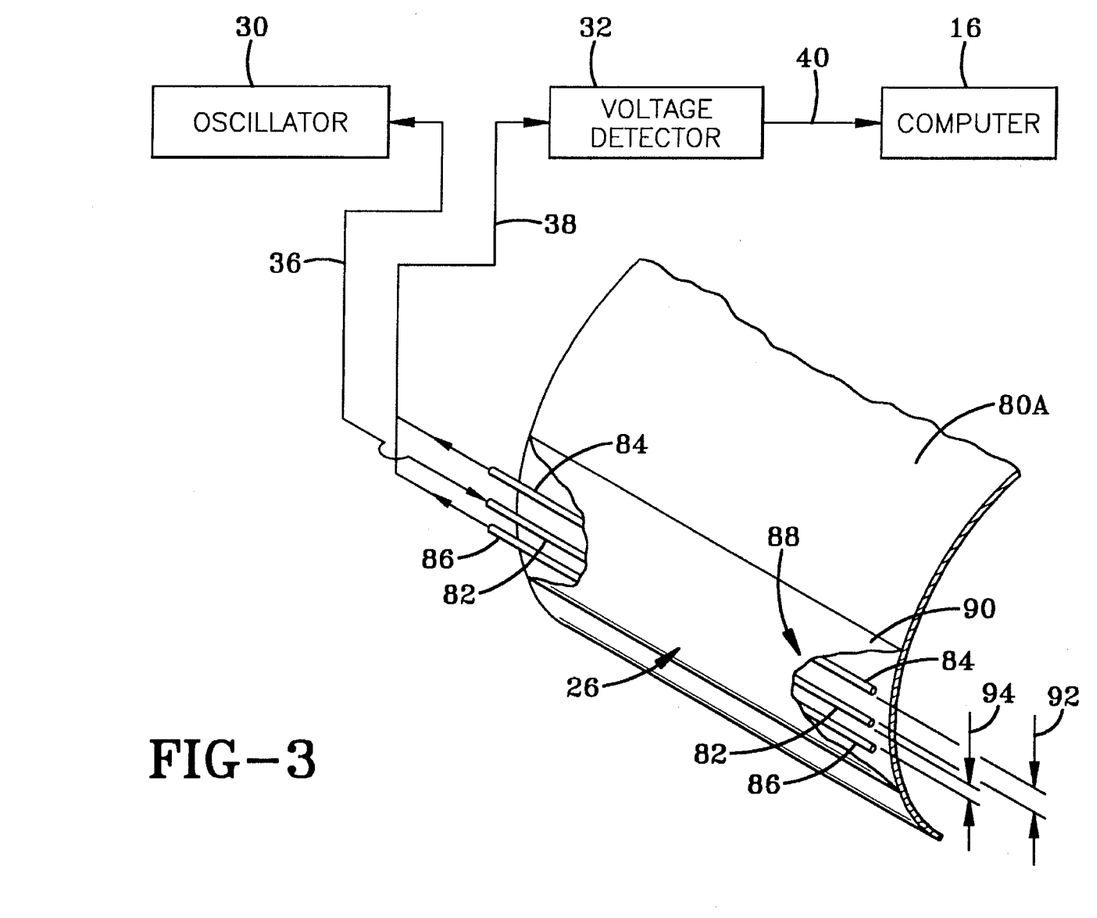
FIGS. 3 and 4 illustrate alternative embodiments of the inductive ice-sensing electrodes of FIGS. 1 and 2.

FIG. 3 illustrates that the inductive ice-sensing electrode array 26 comprises a transmitting electrode 82 and at least one, but preferably at least two, receiving electrodes 84 and 86 arranged into a parallel configuration 88. However, a variety of other configurations, some to be disclosed with reference to FIG. 4 to be discussed, are possible and include more than three electrodes 82, 84 and 86 dependent upon particular circumstances that take into account the shape and location of the surface 80A onto which the electrodes are mounted. The configuration 88 of the electrodes 82, 84 and 86 is arranged within a thin sheet 90 of embedding material, which may be either plastic or polyethylene and either of which material is flush mounted onto the surface 80A of interest so as to reduce aerodynamic drag and insulate electrodes 82, 84, and 86 from direct contact with water, frost or ice. The thin sheet 90 may serve as a known ice removal boot or alternatively, may be embedded, during manufacture, as part of the composite skin structure of the aircraft.

The transmitting electrode 82 is spaced apart from receiving electrodes 84 and 86 (serving as redundant ice sensors) by respective first and second predetermined distances 92 and 94. As previously described, the distances 92 and 94 of the spacing between the electrodes comprise one of the factors that determines the coefficient of coupling of the inductive ice-sensing array 26. Further, the distances 92 and 94 are preferably selected so as to extend the range of ice thickness which may be detected by the ice-sensing array 26. The distances 92 and 94 are chosen to provide the best linearity of signal response to the ice accumulations which disrupt the aerodynamic performance of the particular aircraft surface. In practice, distance 92 may be approximately ½ to 1 min. and distance 94 may be 3 to 5 mm. to provide a signal responsive to the critical ice deposits in the sub-millimeter to millimeter range. Transmitting and receiving electrodes 82, 84, and 86 typically have widths of approximately ¼ to ½ mm. Signal voltage changes of approximately 35 millivolts per meter of detector length are typically observed for a layer of water or clear ice approximately ⅓ mm. thick deposited on the electrodes.

As previously described, the substance located in the general region of the electrodes also contributes to determining the coefficient of coupling of the inductive ice-sensing array 26. More particularly, the presence of water, moisture, or ice on the surface of the sheet 90 alters the inductive coupling between the transmitting electrode 82 and receiving electrodes 84 and 86 and results (as previously described) in a change of the voltage being measured by the voltage detector 32. For example, in the extreme, if the transmitting and receiving electrodes were separated by a substance that manifested a zero (0) coupling resistance, then perfect coupling therebetween would exist.

In operation, and with reference to FIGS. 1 and 3, oscillator 30 applies on signal path 36 an excitation signal to the transmitting electrode 82. The coefficient of coupling between the transmitting electrode 82 and the receiving electrodes 84 and 86 is established by the two factors which are as follows: (1) the predetermined geometry and distance between the transmitting electrode 82 and receiving electrodes 84 and 86, and (2) the inductive coupling susceptibility of the substance in the region between the electrodes. This coefficient of coupling determines the amount or level of the signal that is sensed by the receiving electrodes 84 and 86 and which sensed signal is applied, via signal path 38, to the voltage detector means 32. The voltage detector means 32 generates an output signal, via signal path 40, which is representative of the quantity of the substance present on the surface of the thin sheet 90 that houses the transmitting electrode 82 and receiving electrodes 84 and 86. In flight, this detected substance must be ice at temperatures below freezing or water at temperatures above freezing. A further configuration of the electrodes 82, 84 and 86 may be described with reference to FIG. 4.

Figure 4:
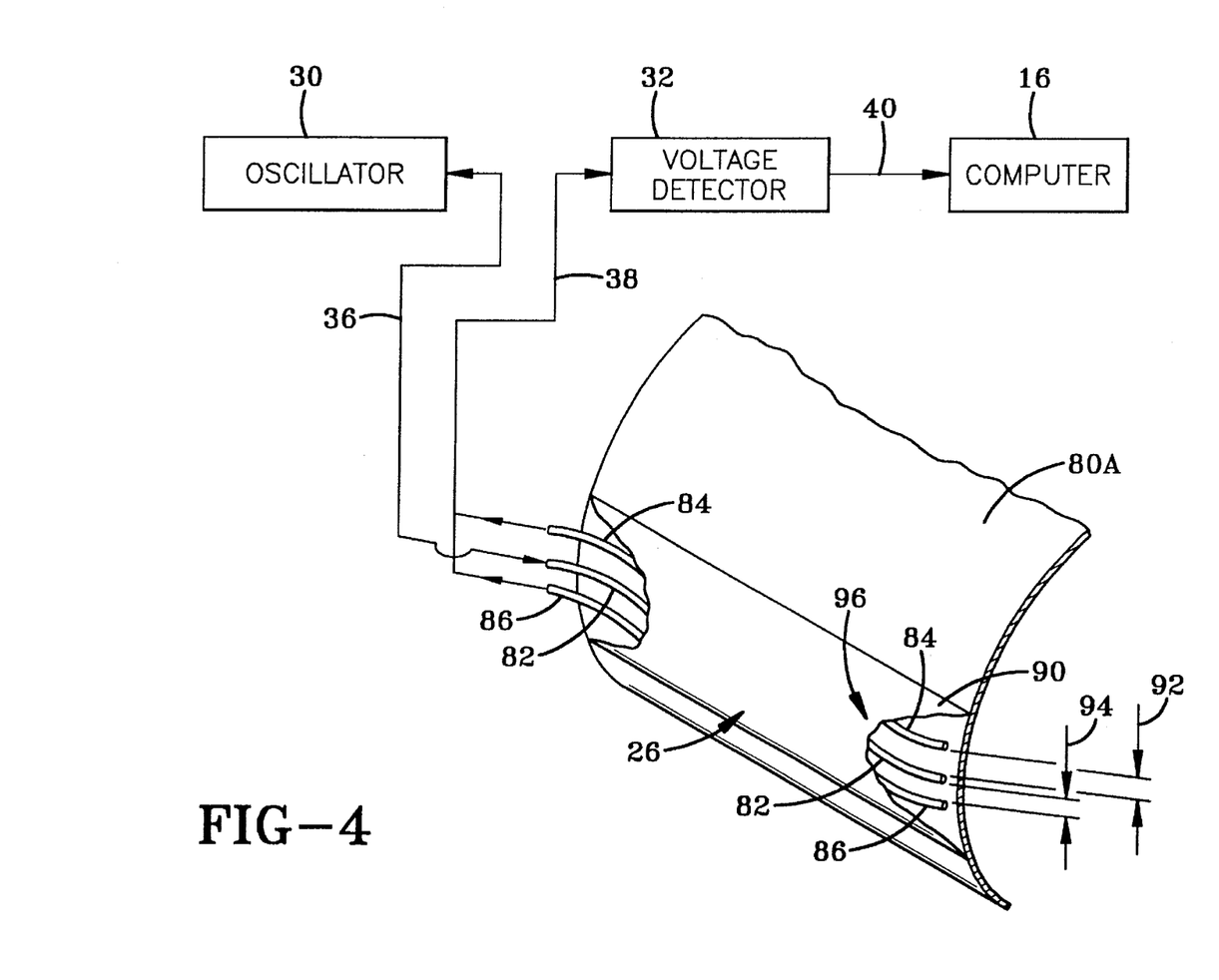

FIG. 4 shows the inductive ice-sensing electrode array 26 which is similar to and operates in the same manner as described with reference to FIG. 3, but has a different configuration 96 of its transmitting electrode 82 and receiving electrodes 84 and 86 as compared to the parallel linear arrangement of configuration 88 of FIG. 3. The configuration 96 may be sinusoidal or of a curving array so as to more advantageously permit stretching when the electrodes 82, 84 and 86 are incorporated into an expanding deicing boot that may Be formed by the thin film 90 in a manner known in the art. This alternative configuration 96 is also more advantageous in that it increases the active sensing area of the electrodes so as to correspondingly increase the sensitivity of the inductive ice-sensing electrode array 26. Furthermore, other configurations, not illustrated, could include a series of electrodes which are interdigitated, interleaved, circular or concentric with respect to each other, square or rectangularly concentric with respect to each other and could also have more than three electrodes. The present invention contemplates various types of configurations to mate with the surfaces of an aircraft as well as other non-aircraft surfaces, such as road vehicles or even sidewalks. Furthermore, the present invention may also be placed onto a helicopter in a manner shown in FIG. 5.

Figure 5:
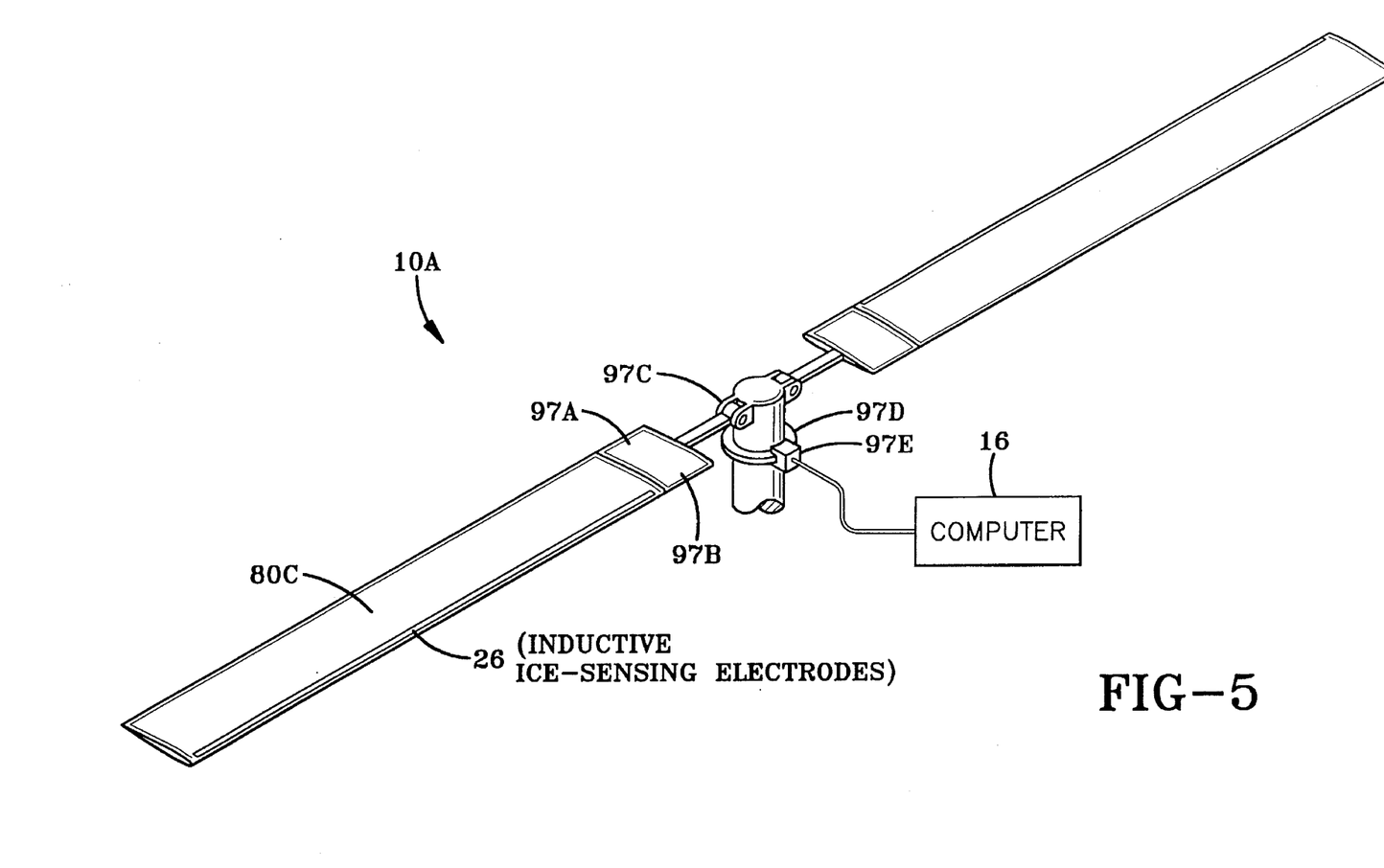
FIG. 5 illustrates an alternative embodiment of the inductive ice-sensing electrodes connected to a helicopter rotor.

FIG. 5 shows, in schematic form, an alternate embodiment of an ice detector and deicing fluid effectiveness monitor system 10A which is similar to and operates in the same manner as described for system 10 with reference to FIGS. 1, 2 and 3, but is adapted to be attached to at least one helicopter rotor (two shown for the sake of clarity) indicated as a third surface of interest 80C having the inductive ice-sensing electrodes 26 attached at one of its edges. The components (18, 28, 30, 32, 34, 48, 50, 52, 54 and 56), already discussed with reference to FIGS. 1–3, form an electronic package 97A that is preferably housed in an aerodynamic cover 97B. Slip rings 97C using multiple brush contacts (not shown) for decreased electrical noise and increased reliability are used to transmit power to the electronic package 97A which rotates with the helicopter rotor 80C. The multiple brush contacts insure that the electronic package 97A receives continuous excitation in spite of any discontinuities that might occur due to the rotational action involved for the slip rings. Additional slip rings 97D and brush contacts 97E can be used to transmit signals between the electronic package 97A and the computer 16 for processing thereof and for generating alarm functions in a manner as already described with reference to FIGS. 1 and 2.

Figure 6:
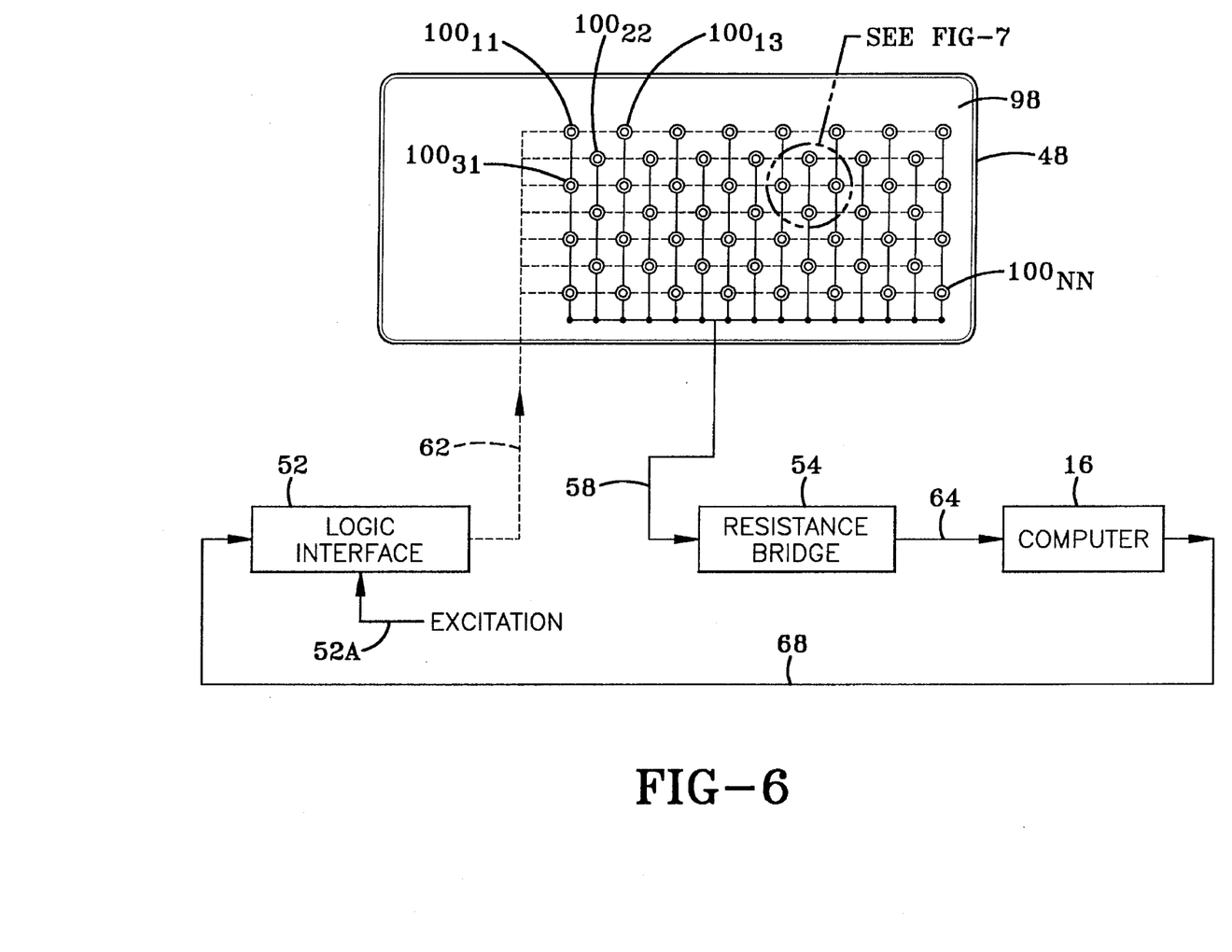
FIG. 6 illustrates the interrelationships of the ionic-conduction cell array with other elements of the system of FIGS. 1 and 2.

The ionic-conduction cell array 48, shown in FIGS. 1 and 2, which acts with the inductive ice-sensing electrode array 26 to form the system 10, is further illustrated in more detail in FIG. 6. The ionic-conduction cell array 48 has a common electrode 98 and a plurality of electrodes formed for each of the cells 100 of the array 48. As seen in FIG. 6, the ionic-conduction cell array has its cells 100 preferably arranged into a row-column matrix so that the cells 100 may be expressed as $100_{11}$, $100_{13}$, ... $100_{22}$ ... $100_{31}$ ... and $100_{nn}$. The logic interface 52, preferably a switching circuit having on-off switching devices, in response to the control signals generated by computer 16 and applied to signal path 68, respectively activate the individual cells $100_{11}$ ... $100_{nn}$ via signal path 62. The computer 16 is programmed, in a manner known in the art, to cause the logic interface to selectively activate the cells $100_{11}$ ... $100_{nn}$ and has prior knowledge to interpret the response of each of the selectively activated cells. The logic interface 52, via signal path 62, also activates the common electrode 98.

In operation, the logic interface 52 applies a first polarity of an excitation signal to the common electrode 98 and a second or opposite polarity of the excitation signal selectably to each of the electrodes of the cells $100_{11}$ ... $100_{nn}$ in the ionic-conduction array 48. The first and second polarities of excitation are generally shown as being received on signal path 52A, but, if desired, may be internally developed by the logic interface 52 itself. The application of the different polarities of excitation selectably causes the individual cells to supply a substance conductivity signal indicative of the ionic conductivity characteristic of the substance, such as the deicer fluid, that is in contact with it. The ionic conductivity signal is applied to the signal path 58, which serves as a bused path to route the conductivity signal to the resistance bridge 54, which, in turn, operates in a manner as previously described to develop an output signal which is representative of the ionic conductivity characteristic of the substance acting as the deicer fluid, which output signal, in turn, is routed to the computer 16 by way of signal path 64. The operation of the ionic-conductive array 48, may be further described with reference to FIG. 7.

Figure 7:
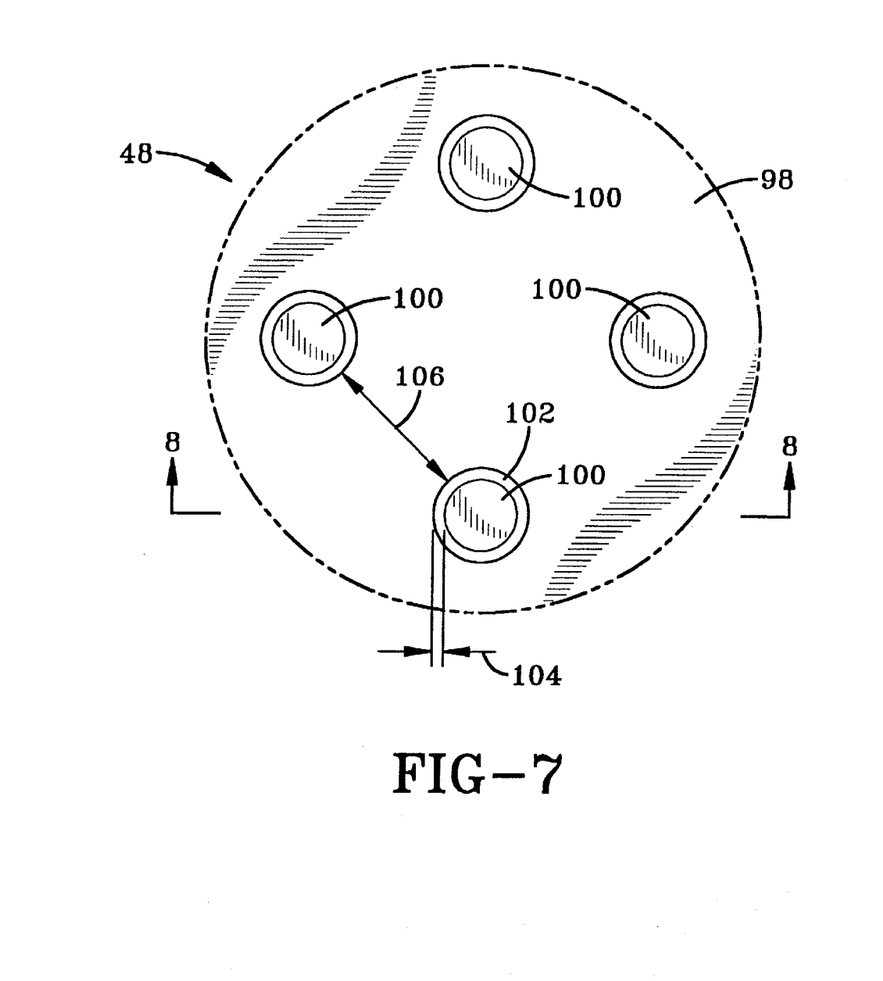
FIG. 7 illustrates details of a section of the ionic-conduction cell array of FIG. 6.

FIG. 7 shows a portion of the ionic-conduction array 48 wherein, as known in the art, the conduction between the selectable electrode 100 and the common electrode 98 is created by positive ions migrating to the cathode or common electrode 98 and the negative ions migrating to the anode or selectable electrode 100. Of course, the polarity applied to the electrodes 98 and 100 may be interchanged so as to reverse the direction of the ion migration and still fall within the purview of the present invention. The selectable electrodes are separated from the common electrode 100 by a gap configuration 102 having a dimension 104 (to be further described) and are spaced apart from each other by a distance 106 (also to be further described). The level of the ionic conduction between the electrodes 98 and 100 is dependent on the specific conductivity of the substance in contact with the selectable electrode 100. For one embodiment, the substance in contact with the electrodes 100 is a deicer fluid which may comprise sodium chloride (NaCl), calcium chloride ($CaCl_2$), calcium and magnesium acetates, and deicers including mixtures of ethylene glycol (antifreeze previously discussed in the "Background" section) and/or diethylene glycol or alcohols. Further, the deicing fluids may comprise a trace of saline or other conductivity enhancing additives so as to enhance the detection operation of the ionic-conduction array 48. Each of the electrodes 100 act as sensors and are initially calibrated with a known solution of a deicer so as to provide a particular conductivity signal proportional to the resistance or conductivity of a known solution. This proportional signal generated by the ionic-conduction array 48 is routed to the resistance bridge 54, which, in turn, routes its responsive signal to the computer 16.

The computer 16 is programmed, as known in the art, to compute the conditions indicated by the conductivity signal received from the resistance bridge 54. More particularly, the computer 16 computes the concentration-vs-conductivity and the freezing point-vs-concentration all for the deicing fluid. The freezing point is primarily determined by the deicer concentration. The computer 16 contains the appropriate application programs so that the freezing point of the deicer concentration may be predicted relative to the ambient of the second surface of interest. The computations and predictions made by the computer 16 are in accordance with the measured temperature sensed by thermocouple 50 approximately located in contact with the ionic-conduction cell array 48. By measuring temperature and the ionic conductivity of the mixture of deicing fluid residue on the ionic-conduction cell array 48, which may have been diluted by melted snow or freezing rain, the concentration of the fluid is determined and, therefore, its related freezing point becomes known. As dilution continues the concentration of the deicing fluid-water mixture weakens, thereby, raising its freezing point until it reaches that of the ambient temperature so as to allow ice to form. The present invention not only provides knowledge of the present effectiveness (strength or concentration) of the deicer fluid, but also allows for the future effectiveness of the deicer fluid to be determined and predicted. Accordingly, the present invention provides knowledge that allows for safe use, but not over use, of the deicer fluid that might otherwise damage the environment. The ionic-conduction cell array 48 may be further described with reference to FIG. 8 which is a view, taken along lines 8—8 of FIG. 7.

Figure 8:
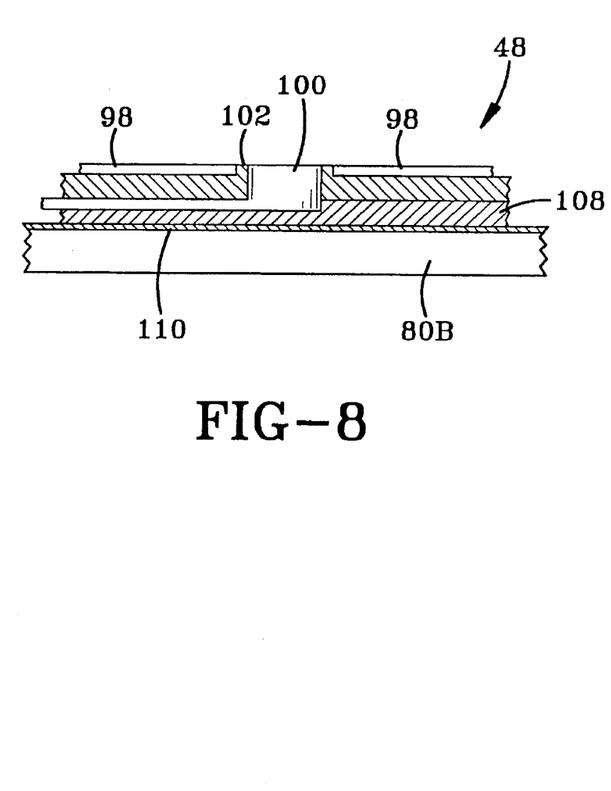
FIG. 8 is a view, taken along lines 8—8 of FIG. 7, illustrating further details of the ionic-conduction cell array of FIG. 6.

FIG. 8 further illustrates the ionic-conduction cell array 48 as comprising the common electrode 98 (uppermost layer of FIG. 8), the selectable electrode 100, the insulating gap configuration 102 between the con. on electrode 98 and each of the selectable electrodes 100, an insulating layer 108 interposed between the selectable electrode 100 and the second surface of interest 80B, and a thin layer of adhesive bond 110 for affixing the ionic-conduction cell array 48 to the second surface of interest 80B. It should be noted that material comprising the adhesive bond 110 may also be used to affix the thin sheet 90 and, thus, the inductive ice-sensing electrode array 26 to the first surface of interest 80A shown in FIG. 2. The ionic-conduction cell array 48 is preferably constructed using printed circuit techniques and employs a corrosion resistant material, such as platinum, for the electrode elements 98 and 100 for increased measurement stability. The selectable electrodes 100 are dimensioned so as to be small enough to detect the effect of individual raindrops or snowflakes which may fall on the aircraft, in particular fall onto the second surface of interest 80B, and thereby dilute the residue deicing fluid, and form dangerous individual ice aerodynamic roughness elements.

The selectable electrodes 100 are encircled by the concentric conduction sensing gap configuration 102. Gap configuration 102, other than the concentric type shown in FIG. 8, may be advantageously employed with specific deicing fluids. For example, the gap configuration 102 may be a shallow cut-out that gathers precipitation in a manner as disclosed in U.S. Pat. No. 4,897,597, herein incorporated by reference. Furthermore, a linear parallel gap configuration may be used to provide increased sensitivity for low conductivity deicing fluids. The gap configuration 102 spans a distance 104 (see FIG. 7) selected so as to detect the ice roughness elements as small as from about 1 mm to about 2 mm in diameter. Further, the distance 106 (see FIG. 7) may be selected to have a typical value of 1 cm. The present invention contemplates various gap configurations that are particularly suited for specific aircraft and non-aircraft usage.

Although the previous description of the ionic-conduction cell array 48 described an output signal that was routed to the resistance bridge 54, if desired the output signal may be routed directly to the computer 16 having appropriate means to receive this output signal.

It should now be appreciated that the practice of the present invention provides for an ice detector and deicer fluid effectiveness monitoring system 10 that accurately measures for icing conditions, predicts the occurrence of such icing conditions, and calculates the concentration and diluted state of the deicing fluid so that the reapplication of the deicing fluid may be critically analyzed so as not to unnecessarily damage the environment yet still provide for the safety of the aircraft.

Figure 9:
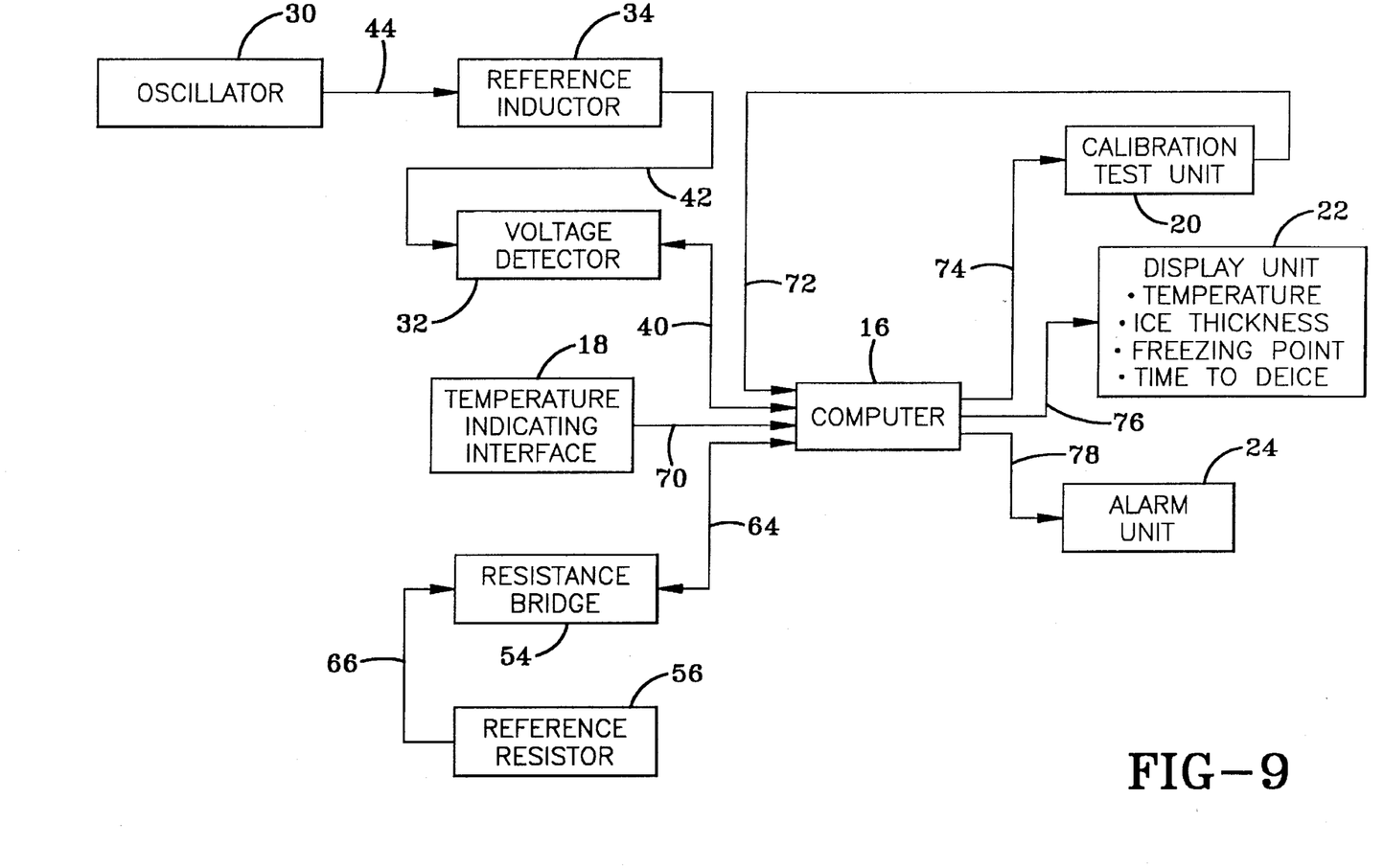
FIG. 9 is a block diagram of the elements associated with the calibration and control and display features of the present invention.

The ice detector and deicer fluid effectiveness monitoring systems 10 and 10A of the present invention, preferably, further comprise calibration and display equipment that may be further described with reference to FIG. 9. The computer 16 primarily controls the calibration and display equipment and is responsive to the requests, present on the signal path 72, initiated by the calibration test unit 20. The calibration test unit 20 has appropriate selectable controls (not shown) so as to initiate the calibration process for the ice detecting subsystem 12 (not shown in FIG. 9), in particular, the inductive ice-sensing electrode array 26, or the deicing fluid effectiveness monitoring subsystem 14 (not shown in FIG. 9), in particular, the ionic-conduction cell array 48. The computer 16, in response to the requests from the calibration test unit 20 to calibrate the inductive ice-sensing array 26, applies an appropriate test control signal, via signal path 40, to the voltage detector 32. The voltage detector 32, in response to the test control signal, interconnects the reference inductor 34, excited by the oscillator 30, into its test inputs. The voltage detector 32 reads the input signal from the reference inductor 34 and routes it back to the computer 16, by way of signal path 40. The computer 16 has a prestored reference value and compares such a reference value against the routed-back test signal to determine the accuracy of the voltage detector 32. Although the computer 16 has been described as prestoring the reference value used to calibrate the voltage detector 32, it should be recognized that the voltage detector 32 itself may store the reference value and may act as a stand-alone device that could calibrate itself on a periodic basis if so desired.

The computer 16, in response to the test request from the calibration test unit 20 to calibrate the ionic-conduction cell array 48, supplies an appropriate test signal to the resistance bridge 54, via signal path 64. The resistance bridge 54, in response thereto, interconnects and measures at its test input having applied thereto the resistance value of the reference resistor 56. The resistance bridge 54 then supplies the test signal back to the computer 16, via the signal path 64. The computer 16 compares its received test input against a known value and determines the accuracy of the resistance bridge 54 which, in turn, is indicative of the accuracy of measurement by the resistance bridge 54 in response to the conductivity signals generated by the ionic-conduction cell array 48. In a manner similar to that described for the voltage detector 32, the resistance bridge 54 may be provided with provisions to act as a stand-alone device to perform its own calibration.

The computer 16 in normal operations computes the freezing point of the possibly contaminated or diluted deicing fluid, the current temperature and also the time before formation of ice may be expected to occur on either the first or second surfaces of interest so as to anticipate the time to deice and, preferably, displays all of these computed quantities on the display panel 22. Further, the computer 16 may comprise means having a prestored value indicative of the lowest allowable ionic conductivity level of the deicer fluid and generate an output signal to the display panel 22 if such low level is reached. Further still, the computer 16 upon detection of any alarm condition notifies the flight crew by way of alarm unit 24, which, preferably, provides audible/ visual alarms.

It should now be appreciated that the practice of the present invention provides for a ice detector and deicing fluid effectiveness monitoring system that also has calibration features so as to maintain the accuracy of its measured quantities as well as control and display features to provide the flight crew and the ground crew with all the necessary information to respond to any present or about to occur alarm conditions.

It should also be appreciated that although the hereinbefore given description was primarily related to an aircraft, the principles of the present invention are applicable to other vehicles, such as trains, or even non-vehicles such as sidewalks requiring surfaces that are free of icing conditions.

Although the invention has been described relative to specific embodiments thereof, it is not so limited and many modifications and variations thereof now will be readily apparent to those skilled in the art in light of the above teaching.

What I claim is:

1. An ice detecting and deicing fluid effectiveness monitoring system comprising:

(a) an inductive ice-sensing electrode array flush mounted onto a first surface of interest and comprising a transmitting electrode and at least one receiving electrode spaced apart from each other, said inductive ice-sensing electrode array having a coefficient of coupling between the spaced-apart transmitting and receiving electrodes that is determined by two factors with the first being a predetermined geometry and spacing between the spaced-apart transmitting and receiving electrodes and the second being an inductive coupling response to a water, frost, or ice substance in a general region of the spaced-apart transmitting and receiving electrodes, said inductive coupling response being indicative of a quantity of the substance in said general region;

(b) a first means for measuring a first temperature and being flush mounted onto said first surface of interest and providing a signal indicative of said first measured temperature;

(c) an ionic-conduction cell array mounted onto a second surface of interest, said ionic-conduction cell array having a common electrode and a selectable electrode for each cell of said ionic-conduction cell array;

(d) a second means for measuring a second temperature and being flush mounted onto second surface of interest and providing a signal indicative of said second measured temperature;

(e) a frequency generator for supplying a first excitation signal and having means for being connected to said transmitting electrode;

(f) a voltage detector means having means for being connected to said at least one receiving electrode and detecting a proportion of said first supplied excitation signal to said transmitting electrode, said proportion being determined by said coefficient of coupling, said voltage detector means generating an output signal of an inductive coupling response representative of a quantity of said water, frost, or ice substance in said general region of said spaced-apart transmitting and receiving electrodes;

(g) means for individually selecting said cells of said ionic-conduction cell array, said selecting means applying a first polarity of a second excitation signal to said common electrode and a second polarity of said second excitation signal to said individually selected cell of said ionic-conduction cell array, said application of said first and second polarities of said second excitation signal causing said individually selected cell to generate a signal indicative of a conductivity of a deicing substance that spans between the individually selected cell and said common electrode;

(h) bridge means connected to receive said signal indicative of the conductivity of said deicing substance, said bridge means generating an output signal representative of an ionic conductivity of said deicing substance in contact with said individually selected cell of said ionic-conduction cell array; and (i) processing means having means for receiving said first measured temperature signal of said first means, said second measured temperature signal of said second means, said inductive coupling response indicative of said quantity of the water, frost, or ice substance in said general region, and said output signal indicative of the ionic conductivity of said deicing substance, said processing means examining (1) said first measured temperature signal of sad first means and said inductive coupling response indicative of said quantity of the water, frost, or ice substance in said general region, and determining if ice is formed on said first surface of interest, and (2) said second measured temperature signal of said second means and said output signal representative of said ionic conductivity of the deicing substance determining a freezing point of said deicing substance on said second surface of interest.

2. A system according to claim 1, wherein said processing means further comprises means for producing at least two output signals that are routed to a display device, the first signal of which is said first measured temperature signal of said first means and the second signal of which is said second measured temperature signal of said second means.

3. The system according to claim 2, wherein said processing means further comprises means for establishing a predetermined range of said signal indicative of the conductivity of said deicing substance and generating an output signal to said display device if said signal indicative of the conductivity of said deicing substance falls outside said predetermined range.

4. The system according to claim 1, further comprising a reference inductor connected to receive the supplied first excitation signal that is also applied to said transmitting electrode, said reference inductor developing a signal applied to a test input of said voltage detector means, said reference inductor developed signal serving as a reference standard signal used to calibrate said voltage detector means.

5. The system according to claim 1, further comprising a reference resistive element connected as a test input of said bridge means and supplying a reference standard used to calibrate said bridge means.

6. The system according to claim 1, wherein said processing means further comprises means for determining a thickness of ice formed on said first surface of interest.

7. The system according to claim 6, wherein said processing means further comprises means for producing an output signal to a display device respectively representative of said thickness of said ice formed on said first surface of interest.

8. The system according to claim 1, wherein said processing means further comprises means for determining if ice is formed and predicting an estimated time when ice is to be formed on said second surface of interest.

9. The system according to claim 1, wherein said processing means further comprises means responsive to an external device for activating each test input of said voltage detector means and said bridge means for performing calibration of said voltage detector means and said bridge means.

10. The system according to claim 1, wherein said processing means further comprises means for respectively generating output signals to an alarm display that generates an audible alarm if ice is formed on said first and second surfaces of interest.

11. The system according to claim 1, wherein said substance in contact with any of said deicing individually selected cell of said ionic-conduction cells array is a deicing fluid selected from the group comprising sodium chloride, calcium chloride, magnesium acetates and mixtures of ethylene glycol, diethylene glycol and alcohols.

12. The system according to claim 11, wherein said selected deicing fluid contains a conductivity enhancing saline.

13. The system according to claim 1, further comprising a display device connected to said processing means, said display device indicating said first and second measured temperatures.

14. The system according to claim 1, wherein said frequency generator comprises an oscillator that generates a signal having a frequency in a range from about 5 khz to about 40 Mhz.

15. The system according to claim 1, wherein said bridge means comprises a resistive network having four legs one of which is connected to receive said signal indicative of the conductivity of said deicing substance.

16. The system according to claim 1, wherein said first and second means for measuring temperatures are selected from the group comprising thermocouples, thermisters and resistance temperature sensors.

17. The system according to claim 1; wherein said at least one receiving electrode comprises first and second electrodes each spaced-apart from said transmitting electrode by a different predetermined distance and each distance being selected to measure a predetermined thickness of ice.

18. The system according to claim 1, wherein said spaced apart transmitting and receiving electrodes are within an enclosure selected from the group comprising a housing formed by a sheet of plastic, a housing formed by a sheet of polyethylene, and a housing formed by an internal surface of said first surface of interest.

19. The system according to claim 1, wherein said spaced apart transmitting and receiving electrodes comprise a configuration selected from the group comprising a parallel linear arrangement, a sinusoidal arrangement and a curving arrangement all of which arrangements substantially cover said first surface of interest.

20. The system according to claim 1, wherein said selectable electrodes are encircled by a gap having a width of about 1 mm to about 2 mm and said selectable electrodes are spaced apart from each other by a distance of about 1 cm.

21. The system according to claim 1, wherein each of said first and second surfaces of interest comprise a region wherein formation of ice causes deleterious results.

22. The system according to claim 1, wherein said inductive ice-sensing electrode array and said ionic-conduction cell array are each flush mounted to its respective surface of interest by means of an adhesive bond material.

23. The system according to claim 1, wherein said first and second surfaces of interest comprise a helicopter rotor and wherein said system is adapted to receive excitation from slip rings that cooperate with multiple brush contacts.

24. An ice detecting subsystem capable of being affixed onto a surface of interest comprising:
(a) a transmitting electrode and at least one receiving electrode spaced apart from each other, said spaced apart transmitting and receiving electrodes having a coefficient of coupling determined by two factors with the first being a predetermined geometry and spacing between the spaced apart transmitting and receiving electrodes and the second being an inductive coupling of a substance in a general region of the spaced-apart transmitting and receiving electrodes, said inductive coupling of the substance in said general region being indicative of a thickness of the substance;
(b) means for measuring temperature located proximate said spaced-apart transmitting and receiving electrodes;
(c) a frequency generator for supplying an excitation signal and having means for being connected to said transmitting electrode; and
(d) a voltage detector means having means for being connected to said at least one receiving electrode and detecting a proportion of said excitation signal supplied to said transmitting electrode, said proportion being determined by said coefficient of coupling between said spaced-apart transmitting and receiving electrodes, said voltage detector means generating an output signal representative of a quantity of the substance in said general region of the spaced-apart transmitting a receiving electrodes.

25. The system according to claim 24, further comprising a reference inductor connected to receive an excitation signal that is also supplied to said transmitting electrode, said reference inductor developing a signal applied to a test input to said voltage detector means, said developed signal of said reference inductor serving as a reference standard signal used to calibrate said voltage detector means.

26. The system according to claim 24, wherein said frequency generater comprises an oscillator that generates a signal having a frequency in the range of about 5 khz to about 40 Mhz.

27. The system according to claim 24, wherein said at least one receiving electrode comprises a first and a second electrode each spaced-apart from said transmitting electrode by a different distance and each different distance being selected to measure a predetermined thickness of ice.

28. The system according to claim 24, wherein said spaced apart transmitting and receiving electrodes are within an enclosure selected from a group comprising a housing formed by a sheet of plastic, a housing formed by a sheet of polyethylene, and a housing formed by an internal surface of said surface of interest.

29. The system according to claim 24, wherein said spaced apart transmitting and receiving electrodes comprise a configuration selected from the group comprising a parallel linear arrangement, a sinusoidal arrangement, and a curving arrangement all of which arrangements substantially cover said first surface of interest.

30. A deicing fluid effectiveness monitoring subsystem capable of being affixed onto a surface of interest comprising:
   (a) an ionic-conduction cell array mounted onto said surface of interest, said ionic-conduction cell array having a common electrode and a selectable electrode for each cell of said ionic-conduction cell array;
   (b) means for measuring a temperature located proximate said ionic-conduction cell array;
   (c) means for individually selecting cells of said ionic-conduction cell array, said selecting means applying a first polarity of an excitation signal to said common electrode and a second polarity of said excitation signal to said individually selected cell of said ionic-conduction cell array, said application of said first and second polarities of said excitation signal causing said individually selected cell to generate a signal indicative of a conductivity of a substance that spans between the individually selected cell and said common electrode.

31. The deicing fluid effectiveness monitoring system according to claim 30 further comprising a resistance bridge means connected to receive said signal indicative of the conductivity of said substance, said resistance bridge means generating an output signal representative of an ionic conductivity of a substance in contact with said individually selected cell of said ionic-conduction cell array.

32. The system according to claim 31, further comprising a reference resistive element connected as a test input of said resistance bridge means and supplying a reference standard used to calibrate said resistance bridge means.

33. The system according to claim 31, wherein said selectable electrodes for each cell of said ionic-conduction cell array are encircled by a gap having a width of about 1 mm to about 2 mm and said selectable electrodes are spaced apart from each other by a distance of about 1 cm.

34. The system according to claim 30, wherein each of said common electrodes and said selectable electrodes comprises platinum.

* * * * *